P. B. DONAHOO.
TIRE SLEEVE FASTENING APPARATUS.
APPLICATION FILED MAY 29, 1909.
957,313.
Patented May 10, 1910.
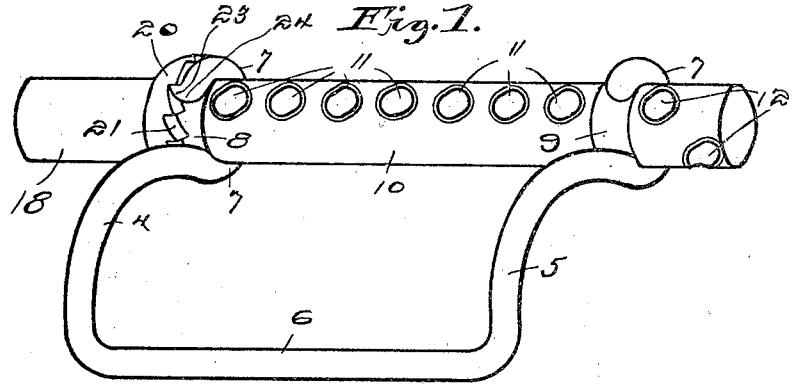
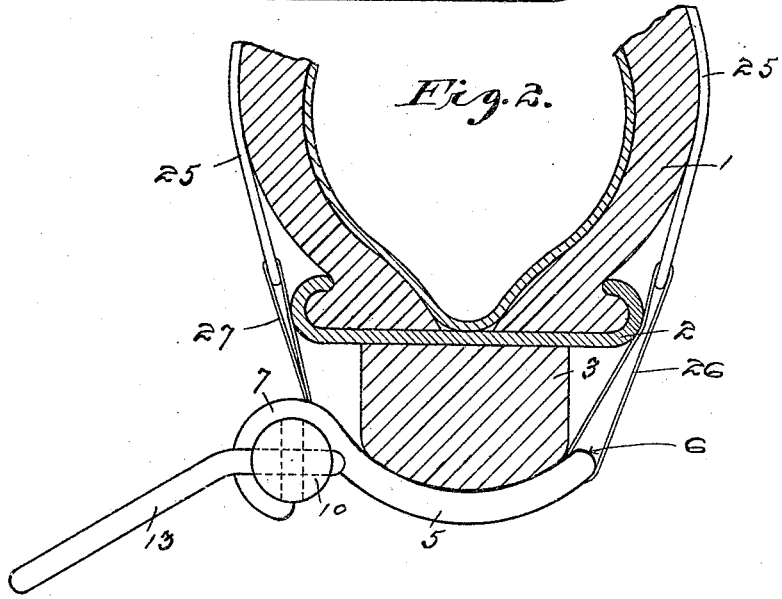
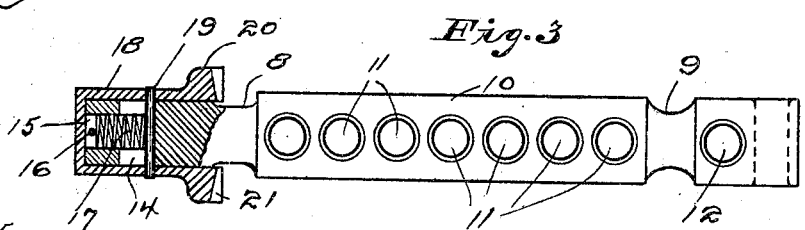
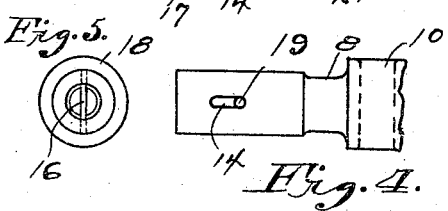
WITNESSES:
INVENTOR
Peter B. Donahoo
BY
E. E. Vrooman
his ATTORNEY.

UNITED STATES PATENT OFFICE.

PETER B. DONAHOO, OF OAKLAND, CALIFORNIA, ASSIGNOR OF ONE-HALF TO ROY HUNT MORRIS, OF OAKLAND, CALIFORNIA.

TIRE-SLEEVE-FASTENING APPARATUS.

957,313.  Specification of Letters Patent.  Patented May 10, 1910.

Application filed May 29, 1909. Serial No. 499,236.

*To all whom it may concern:*

Be it known that I, PETER B. DONAHOO, citizen of the United States, residing at Oakland, in the county of Alameda and State of California, have invented certain new and useful Improvements in Tire-Sleeve-Fastening Apparatus, of which the following is a specification, reference being had therein to the accompanying drawing.

This invention relates to pneumatic tires, and has especially in view a novel device for holding a patch or sheathing thereon so as to prevent the air escaping from the tire when the latter is punctured.

In carrying out the object of the invention generally stated above it is contemplated employing a supporting frame adapted to be held in contact with a wheel felly and provided with a shaft upon which the lacings or other fastenings are wound to tighten the patch or sheathing about the tire, said shaft being provided with an automatically acting locking device for engagement with said frame to prevent rotation of the shaft in one direction.

It will be understood, of course, that the essential features involved in carrying out the invention are necessarily susceptible of changes in details and structural arrangements, but one preferred and practical embodiment of the same is shown in the accompanying drawings, wherein—

Figure 1 is a perspective view of the improved patch tightener, the same being shown removed from the wheel rim. Fig. 2 is a cross sectional view of a portion of a tire showing the improved patch tightener connected thereto. Fig. 3 is a detail side elevation of the shaft of the patch tightener, the locking device therefor being shown in section. Fig. 4 is a detail side elevation of the locking end portion of the shaft, the locking device being removed. Fig. 5 is an end elevation thereof, the locking device being shown in position thereon.

Referring to said accompanying drawings by numerals, 1 designates a pneumatic tire, 2 the rim and 3 the felly, all of which may be of the usual or any desired construction.

The improved patch adjuster is composed primarily of a supporting frame preferably formed of a single length of material, the end arms 4 and 5 of which are curved or bowed to correspond with the contour of the felly 3. Said end arms are connected by means of the side member 6. The outer or free ends of said arms 4 and 5 are bent upon themselves to form annular bearings 7 which are seated in the annular recesses 8—9 of the shaft 10. Said shaft is preferably of a cylindrical shape and is provided with a plurality of regularly spaced apart transversely extending openings 11 which are located between the two recesses 8—9. One end portion of said shaft is provided with angularly disposed transversely extending openings 12 for the reception of one end of a wrench or other tool 13 by means of which said shaft may be rotated. The other end of said shaft is provided with a transversely extending slot 14 which is intersected by a longitudinally extending end recess 15. A pin 16 extends across the outer end of the end recess 15 and serves as an abutment for one end of a spiral spring 17 seated in said recess.

A locking cap 18 is slidably mounted on the end of the shaft over the slotted portion thereof and is provided with a transversely extending pin 19 which projects through the slot 14 and against which said spring 17 abuts with sufficient pressure to normally force said cap inward on said shaft. The inner end of said cap is provided with an annular flange 20 the front face of which has ratchet teeth 21 formed thereon which engage with a tooth 23 formed by the outturned end 24 of the end arm 4 of the frame, to prevent the shaft being rotated in one direction.

The patch or sheathing 25 which surrounds the tire 1 has lacings 26—27 connected to its edges which engage respectively with the arm or member 6 of the frame and the openings 11 of the shaft 10.

In applying the patch adjuster to a tire, the patch is placed about the tire in the usual manner and drawn tight thereon by rotating the shaft 10 while the frame is held in contact with the felly 3. While said shaft is being rotated, the spring pressed locking cap will be held in such a position on the shaft 10 that its teeth will be moving in the plane of the tooth 23 of the arm 4 of the frame so that said tooth will "click" thereover, similar to the usual pawl and ratchet, but a backward movement of said shaft will immediately cause a binding engagement of said tooth 23 with the teeth of said cap, thereby locking said shaft rigid with the frame. To release the shaft, the cap may be forced outwardly on the shaft manually against the tension of the spring 17, whereupon said shaft will be free to rotate.

It will be seen from the foregoing that the invention may be readily applied to a felly and the shaft thereof rotated to tighten a patch or sheathing about a tire and through the described automatically acting locking device, said shaft will be retained in an immovable position relatively to said patch, thus preventing the same slipping or otherwise leaving its puncture-closing position upon said tire.

What I claim as my invention is:—

1. A device of the character described comprising a frame, a shaft rotatable therein, and a spring-pressed locking cap carried by said shaft and adapted to engage with said frame to prevent rotation of said shaft therein in one direction.

2. A device of the character described comprising a frame, a shaft rotatable therein, and an automatically actuated locking cap carried by said shaft for preventing the same rotating in one direction.

3. A device of the character described comprising a frame, a shaft journaled therein, a cap slidably mounted on said shaft, and means for automatically moving said cap on said shaft to cause the same to engage with said frame, to prevent rotation of said shaft in one direction.

4. A device of the character described comprising a frame, a shaft journaled therein, and a cap slidable on but rotatable with said shaft for engagement with said frame to prevent rotation of said shaft in one direction.

5. A device of the character described comprising a frame, a shaft rotatable therein and provided with a slotted and recessed end, a locking cap mounted on said end, a pin carried by said cap and projecting through the slot in the end of the shaft, and a spring in the recess of said end and adapted to force said cap into engagement with said frame to prevent rotation of said shaft in one direction.

6. A device of the character described comprising a frame provided with bearings, a ratchet tooth carried by one end of said frame, a shaft rotatably mounted in said bearings, a spring-pressed locking cap slidably mounted on said shaft and provided with locking teeth adapted to engage with said tooth of the frame to prevent the shaft being rotated in one direction.

7. A device of the character described comprising a frame provided with end arms terminating in bearings, a ratchet tooth carried by one of said arms, a shaft rotatably mounted in said bearings and provided with a slot and an intersecting recess in one end, a cap mounted over the slotted and recessed end of said shaft, a pin carried by said cap and projecting through said slot, and a spring mounted in said recess and bearing against said pin to force said cap in engagement with said ratchet tooth.

8. A patch adjuster for tires comprising a frame adapted for engagement with a wheel rim and provided with a ratchet tooth, a patch adjusting shaft rotatably mounted in said frame, and an automatically acting locking device carried by said shaft for engagement with the ratchet tooth of said frame to hold the shaft in a patch-tightening position.

9. A patch adjuster for tires comprising a frame provided with a ratchet tooth, a shaft rotatably mounted therein and provided with an end slot and intersecting recess, a cap mounted over the slotted end of said shaft and provided with a pin which projects through said slot, and a spring seated in said recess and bearing against said pin for forcing said cap into engagement with said ratchet tooth.

10. A patch adjuster for tires comprising a frame provided with a ratchet tooth, a shaft rotatably mounted therein and provided with a transversely extending end slot and a longitudinally extending intersecting recess, a cap slidable over the slotted end of said shaft and provided with a pin which projects through the said end slot, said cap being provided with teeth surrounding its open end, and a spring seated in said recess and bearing against said pin for forcing the teeth of said cap into engagement with the tooth of said frame.

11. A device of the character described comprising a frame, a shaft rotatable therein and provided with a slotted and recessed end, a cap slidably mounted on said slotted end of the shaft, a pin carried by said cap and projecting through said slot, and a spring seated in said recess and bearing against said pin for forcing said cap into engagement with said frame.

12. A device of the character described comprising a frame, a ratchet tooth carried by said frame, a shaft rotatably mounted in said frame, and a spring pressed locking cap slidably mounted on one end of said shaft and provided with end teeth for engagement with said ratchet tooth.

In testimony whereof I hereunto affix my signature in presence of two witnesses.

PETER B. DONAHOO.

Witnesses:
F. J. SCHROEDER,
H. C. SCHROEDER.